(12) United States Patent
Balakrishnan et al.

(10) Patent No.: US 7,640,515 B2
(45) Date of Patent: Dec. 29, 2009

(54) SYSTEM FOR DYNAMICALLY MAPPING INPUT DEVICE MOVEMENT AS A USER'S VIEWPOINT CHANGES

(75) Inventors: Ravin Balakrishnan, Toronto (CA); Gordon Kurtenbach, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 320 days.

(21) Appl. No.: 10/841,632

(22) Filed: May 10, 2004

(65) Prior Publication Data
US 2004/0210852 A1  Oct. 21, 2004

Related U.S. Application Data

(63) Continuation of application No. 09/560,869, filed on Apr. 28, 2000, now Pat. No. 6,981,229.

(51) Int. Cl.
G06F 3/048 (2006.01)
G06F 3/033 (2006.01)

(52) U.S. Cl. .................. 715/848; 715/850; 715/857; 715/858; 715/861; 715/863

(58) Field of Classification Search ......... 715/848–863, 715/764–767, 810; 345/619, 642, 157, 419, 345/672, 587
See application file for complete search history.

(56) References Cited

U.S. PATENT DOCUMENTS

| | | | |
|---|---|---|---|
| 4,267,555 A | 5/1981 | Boyd et al. | |
| 4,542,377 A | 9/1985 | Hagen et al. | |
| 4,545,069 A | 10/1985 | Kermisch | |
| 4,862,388 A * | 8/1989 | Bunker | 345/427 |
| 5,187,776 A | 2/1993 | Yanker | |
| 5,329,289 A | 7/1994 | Sakamoto et al. | |
| 5,422,987 A | 6/1995 | Yamada | |
| 5,471,571 A | 11/1995 | Smith et al. | |
| 5,566,098 A | 10/1996 | Lucente et al. | |
| 5,577,176 A | 11/1996 | Friedman et al. | |

(Continued)

OTHER PUBLICATIONS

Steven M. Seitz et al., "Plenoptic Image Editing", to appea in Proceedings ICCV 98.*

(Continued)

*Primary Examiner*—Tadeese Hailu
(74) *Attorney, Agent, or Firm*—Staas and Halsey LLP

(57) ABSTRACT

The present invention is directed to a two-handed input control system that dynamically changes an input-to-object mapping for mapping movement of a graphical object on a display of a virtual scene as the viewpoint of the virtual scene changes. As input to the system for changing the position of the graphical object occurs, the mapping is revised to reflect changes in the viewpoint so that the object moves as inherently expected. That is, changes to the viewpoint change the mapping so that a correspondence between the viewpoint and the input space is always maintained. During movement of the object a screen cursor is visually suppressed so that the movement of the graphical object and the screen cursor do not split the attention of the user. The screen cursor is always maintained within the visual display region of the virtual scene even when the object moves out of the visual display region by moving the cursor to a center of the screen when it reaches an edge of the screen.

20 Claims, 8 Drawing Sheets

U.S. PATENT DOCUMENTS

| | | | | |
|---|---|---|---|---|
| 5,687,307 | A | * | 11/1997 | Akisada et al. ............. 345/428 |
| 5,798,752 | A | | 8/1998 | Buxton et al. |
| 5,818,420 | A | | 10/1998 | Mitsumine et al. |
| 5,877,748 | A | * | 3/1999 | Redlich ...................... 345/163 |
| 5,917,486 | A | | 6/1999 | Rylander |
| 6,034,691 | A | * | 3/2000 | Aono et al. ................. 345/582 |
| 6,232,957 | B1 | * | 5/2001 | Hinckley .................... 345/156 |
| 6,280,223 | B1 | * | 8/2001 | Lin ............................ 439/342 |
| 6,323,846 | B1 | * | 11/2001 | Westerman et al. ......... 345/173 |
| 6,333,753 | B1 | * | 12/2001 | Hinckley .................... 715/768 |
| 6,671,651 | B2 | * | 12/2003 | Goodwin et al. ............ 702/152 |
| 6,999,065 | B1 | * | 2/2006 | Tognazzini ................. 345/173 |
| 7,098,933 | B1 | * | 8/2006 | Thoemmes et al. ......... 345/677 |
| 7,102,635 | B2 | * | 9/2006 | Shih et al. .................. 345/419 |

OTHER PUBLICATIONS

"Bias in Quantifying Judgments", E. C. Poulton, Lawrence Erlbaum Assoc., Publications, 1989.

"Depth Perception Through Motion", Myron L. Braunstein, Academic Press, 1976.

"Engineering Psychology and Human Performance", Wickens et al., Prentice Hall, 2000.

"The Psychology of Visual Perception" Haber et al. Holt, Rinehart and Winston, Inc., 1973.

"Three-Dimensional Displays: Perception, Implementation, and Applications" Wickens, et al., University of Illinois, Aviation Research Laboratory, Oct. 1989.

Balakrishnan et al, (1997) The Rockin' Mouse: Integral 3D manipulation on a plant. Proceedings of the CHI'97 Conference, 311-318, ACM.

Bier et al, (1993) Toolglass and magic lenses: The see-through interface. Proceedings of the ACM Sig-graph, Conference, 73-80, ACM.

Buxton et al, (1986) A-study in two-handed input. Proceedings of the CHI'86 Conference 321-326. ACM.

Cutler et al, (1997) Two-handed direct manipulation on the responsive workbench. Proceedings of 1997 Symposium on Inter-active 3D graphics, 107-114, ACM.

Hinckley et al, (1994) Passive real-world interface props for neurosurgical visualization. Proceedings of the CHI'94 Conference, 452-458, ACM.

Hinckley et al, (1997) Attention and feedback: The bimanual frame of reference. Proceedings of the 1997 Symposium on Interactive 3D Graphics, 121-126, ACM.

Hinckley et al, (1997) Cooperative bimanual action. Proceedings of the CHI'97 Conference 27-34, ACM.

Kabbash et al, (1994) Two-handed input in a compound task. Proceedings of the CHI'94 Conference, 417-423, ACM.

Kurtenbach et al, (1997) The design of a GUI paradigm basaed on tablets, two-hands, and transparency. Proceedings of the CHI'97, 35-42, ACM.

Leganchuk et al, (in press) Manual and cognitive benefits of two-handed input: An experimental study. To appear in ACM Transactions on Computer Human Interaction, ACM.

Ware et al, (1997) Selection using a one-eyed cursor in a fish tank VR environment. ACM Transactions on Computer Human Interaction, 309-322, ACM.

Zelenik et al, (1997) Two pointer input for 3D interaction. Proceedings of the 1997 Symposium on Interactive 3D Graphics, 115-120, ACM.

U.S. Appl. No. 08/941,102, filed Sep. 1997, Buxton et al.

Balakrishnam et al. (1999) Exploring Bimanual Camera Control and Object Manipulation in 3D Graphics Interfaces, Proceedings of 1999 ACM Conference on Human Factors in Computing Systems pp. 56-63.

MultiGen-Paradigm Home Page.htm, Apr. 28, 2000.

Toshiyuki Masui et al., "Elastic Graphical Interfaces for Precise Data Manipulation", ACM Conference on Human Factors in Computing Systems (CHI'95) Conference Companion (Apr. 1995), ACM press, pp. 143-144.

Office Action mailed Apr. 23, 2003 in U.S. Appl. No. 09/560,869.

Final Office Action mailed Nov. 19, 2003 in U.S. Appl. No. 09/560,869.

Office Action mailed Aug. 13, 2004 in U.S. Appl. No. 09/560,869.

Notice of Allowance and Fee(s) Due mailed Apr. 25, 2005 in U.S. Appl. No. 09/560,869.

* cited by examiner

FIG. 1
(PRIOR ART)
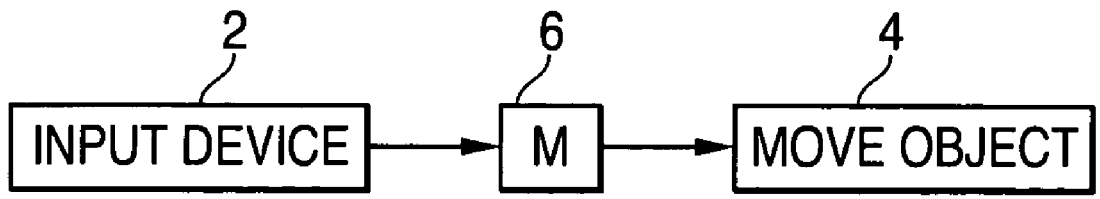
OR
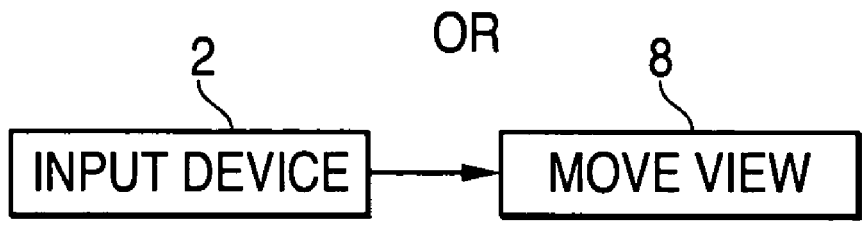
FIG. 2
(PRIOR ART)
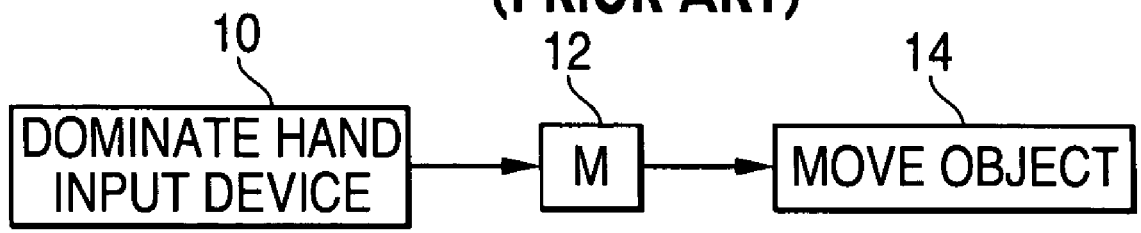
AND
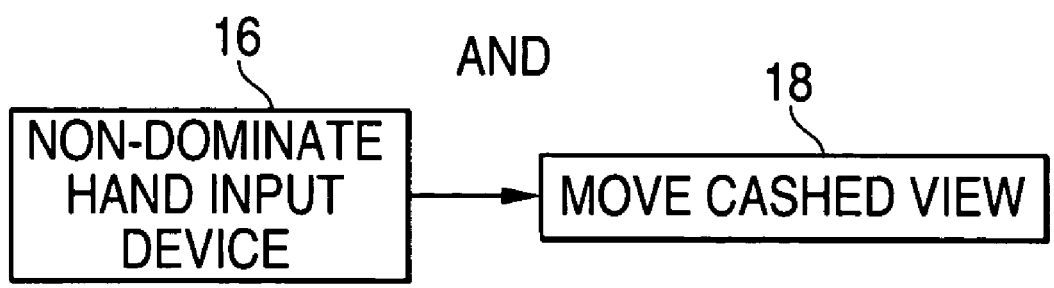

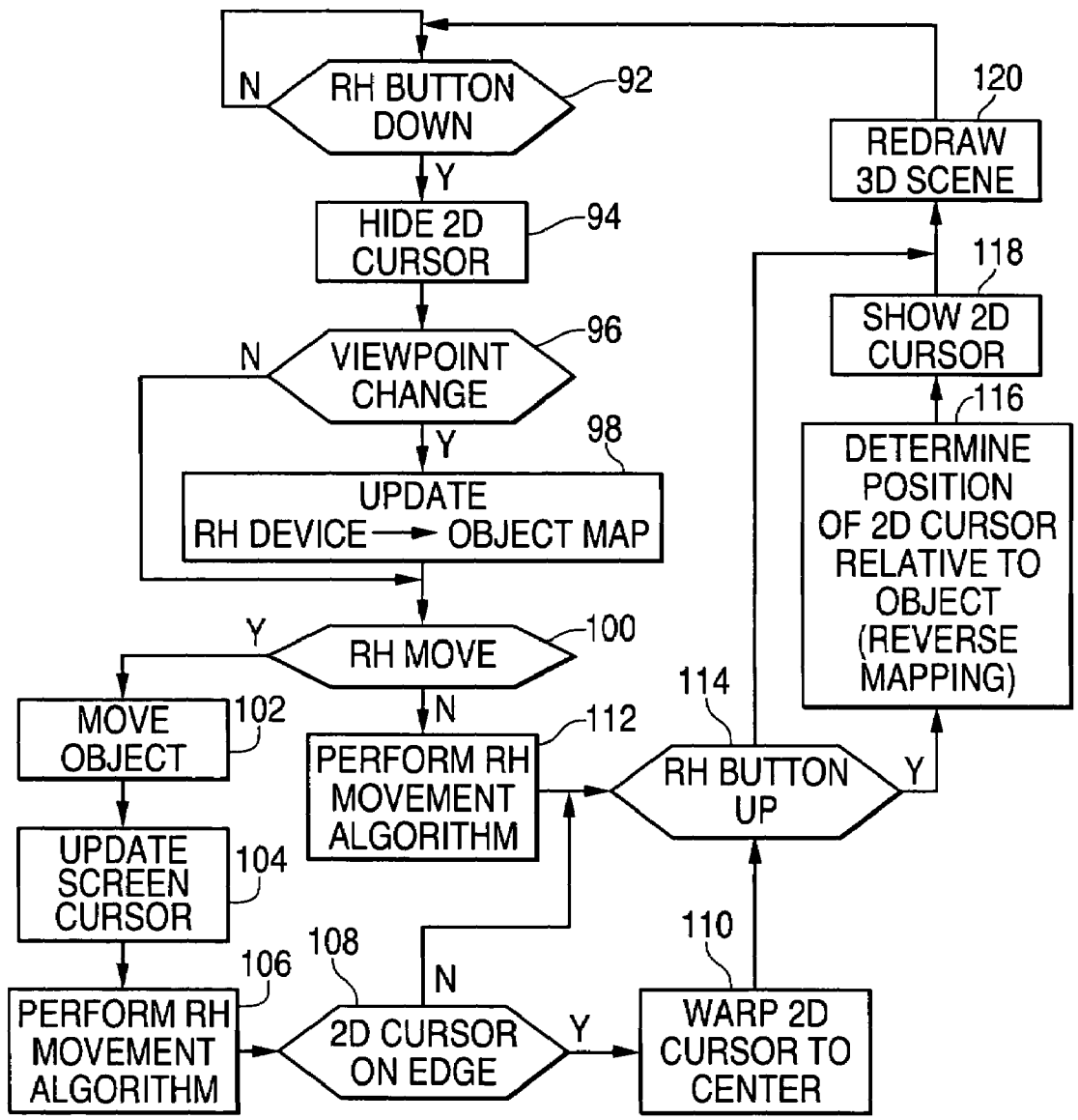

SYSTEM FOR DYNAMICALLY MAPPING INPUT DEVICE MOVEMENT AS A USER'S VIEWPOINT CHANGES

CROSS-REFERENCE TO RELATED APPLICATIONS

This application is a continuation of U.S. application Ser. No. 09/560,869 filed Apr. 28, 2000 now U.S. Pat. No. 6,981,229.

BACKGROUND OF THE INVENTION

1. Field of the Invention

The present invention is directed to a system for allowing two-handed user control of a graphical object and a view into a scene and, more particularly, to a system for inputting viewpoint change information and graphical object change information, dynamically changing an input-to-object mapping responsive to the viewpoint change information, and moving the graphical object responsive to the graphical object change information and the dynamically changed mapping where a screen cursor disappears while the object is being moved and is maintained on the screen wherever the object moves.

2. Description of the Related Art

Typically, an input device, such as a mouse or stylus, controls a graphical object in a three-dimensional (3D) system, such as an animation software package, via some input-to-object mapping M, such as a mapping that maps motions of a mouse proportionally to motions of a cursor on a display screen. In conventional one-handed interface systems, such as where a mouse is used to control the cursor and also used to control a view or viewpoint of a 3D scene, the input device 2 controls 4 the object through the mapping 6, or controls 8 the view as depicted in FIG. 1. Thus, when the object is being manipulated, the view is static, and the input-object mapping (M) is static. That is, object control and viewpoint control are not integrated.

Systems where users manipulate two input devices while interacting with a computer system are becoming more common, such as when a graphic model designer of an object, such as an automobile, uses a stylus in one hand to draw lines of a three-dimensional (3D) model while the other hand manipulates a mouse to change the view or viewpoint of the 3D scene.

A camera control metaphor is used in such situations to discuss the change in viewpoint and is often referred to as "tumbling" a virtual camera, and is analogous to holding and manipulating a turntable (represented by the ground plane in the graphics scene) in one's hand. The turntable can be rotated about it's normal axis as well as the horizontal screen axis. Technically, this requires revolving the camera about the center of the scene by varying the azimuth and elevation angles in the perspective view. This allows objects in the middle of the 3D scene to be viewed from any direction. The viewing distance from the object, as well as the view angle (or focal length of the camera) is kept constant. This camera control metaphor is ideal when the object(s) of interest are located in the center of the 3D scene. It is one of the most frequently used camera controls in mainstream 3D applications, others such as panning (moving the center of interest), zooming/dolly (moving closer or further away from the center of interest) are important but less frequently used when working on a single object in the scene.

To help understand the present invention, assume that the user is using a two-handed interaction technique where the left (non-dominant) hand device controls the user's view of the scene (tumble, pan, zoom, etc. the virtual camera), while the right hand simultaneously manipulates objects, such as a paint brush (see http://www.dgp.utoronto.ca/people/ravin/papers/chi992hands.pdf or Exploring Bimanual Camera Control and Object Manipulation in 3D Graphics Interfaces, Balakrishnan, et al, pgs. 56-63, Proceedings of 1999 ACM Conference on Human Factors in Computing Systems, Chicago 1999, incorporated by reference herein). A problem that arises in this style of interaction is how to map the right (dominant) hand device's movement to movement of the graphical object being controlled, while the underlying viewpoint is simultaneously changing via motion of the (non-dominant) left hand. The default solution, which happens when in a status-quo graphics system, such as the Alias|Wavefront Maya™, where the camera operations are controlled by the left hand, is that the viewpoint is cached for the duration of the right-hand's manipulator drag operation. As such, if the viewpoint is changed during the drag, the drag operates based on the old, cached, viewpoint and the results are non-obvious to the user.

This is depicted in FIG. 2 where the dominant hand input device 10 acts through the mapping 12 to move 14 the object while the non-dominant hand input device 16 moves the cached view. Using the two handed interaction with the conventional processes, the view could change while the object is being manipulated. However, the input-to-object mapping (M) is not updated to reflect the changing viewpoint. This results in the "wrong" interaction being applied to the object. Again, object movement and viewpoint changes are not integrated.

For example, say the right hand is dragging on a left-right translation manipulator. Left-right movement of the mouse corresponds to left-right movement of the graphical object on the screen. FIG. 3A shows an example of this where a mouse 18 is moved from right to left and a corresponding motion of the graphical widget or pointer 20 also moves from right to left in a computer produced image display 22. Now, if the view is tumbled 180 degrees about the up axis, left-right movement of the mouse will correspond to right-left (i.e., opposite) movement of the graphical object 20 on the screen 22. FIG. 3B shows an example of this where the mouse 18 is moved from right to left and the motion of the pointer 20 moves from left to right in the display of the scene. This is a motion that is opposite to what the user inherently or intuitively expects.

What is needed is a system that coordinates a user's movement of a control device with the motion of an on screen object in a way which is intuitive and as the user would expect.

SUMMARY OF THE INVENTION

It is an object of the present invention to provide a system that coordinates a user's movement of a control device with the motion of an on screen object in a way which is intuitive and as the user would expect.

It is another object of the present invention to provide a system which dynamically changes the mapping of input device movement to the movement of graphical manipulators as the view of a 3D scene changes.

It is also an object of the present invention to provide a system that facilitates two handed interaction input which is intuitively correct.

It is a further object of the present invention to maintain correct 2D cursor to 3D object correspondence as the view changes.

The above objects can be attained by a system that dynamically changes an input-to-object mapping for mapping movement of a graphical object on a display of a virtual scene as the viewpoint of the virtual scene changes. The changes to the viewpoint change the mapping so that a correspondence between the viewpoint and the input space is always maintained.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 illustrates mapping when a single input device is used to conventionally control object movement and view.

FIG. 2 illustrates mapping when a pair of input devices is used to conventionally control object movement and view.

FIG. 8 shows the operations of the invention.

DESCRIPTION OF THE PREFERRED EMBODIMENTS

The present invention describes a system for dynamically changing the mapping of input device movement to the movement of graphical manipulators as the view of a 3D scene changes. This is primarily useful for two-handed interactions where one hand controls the viewpoint and the other handles object manipulation.

The first part of the solution to the problem identified previously is to update the viewpoint transformation for the right-hand's input-output mapping every time the view changes, even while a drag operation is in progress. This will ensure that the mapping of input device movement to graphical object movement is always consistent. In the previous example, left-right movement of the input device will always result in left-right movement of the graphical object, rather than the reversal of direction as when the status-quo technique is used. The importance of the approach is that the input—output mapping is dynamically and simultaneously changed as the view changes. That is, object motion and viewpoint changes are integrated or combined.

A secondary, but nonetheless important, issue is the relationship between the input device system, such as the 2D mouse cursor, and the graphical manipulator, such as a paint brush. Typically, the 2D mouse cursor maintains visual correspondence with the underlying 3D manipulator during an operation, such as a drag. However, if the viewpoint is changed during a drag this correspondence may be lost. This divides the user's visual attention between two places (2D cursor and 3D manipulator) and is undesirable. Further, the 2D mouse cursor may hit the edge of the window/screen and not allow further movement although the 3D manipulator may still be in a central area of the display and could benefit from further movement. A solution to this problem is to hide the 2D mouse cursor once a 3D manipulator is selected. As long as the 3D manipulator operation is active, the 2D mouse cursor remains hidden and mouse movements are computed in a relative manner. If the mouse cursor hits the edge of the screen, then it is warped, preferably back to a predetermined point on the screen, such as the center of the screen, to allow for further mouse movements to be received by the application.

Figure 3A:
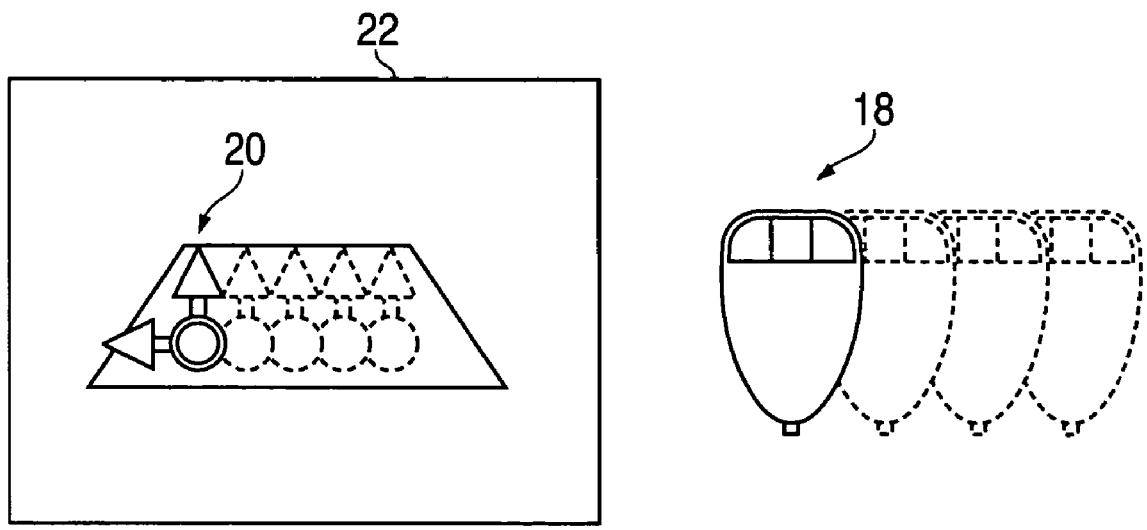
FIG. 3A depicts movement of an input control device and a corresponding on screen graphical object when the viewpoint and the input reference agree.
Figure 3B:
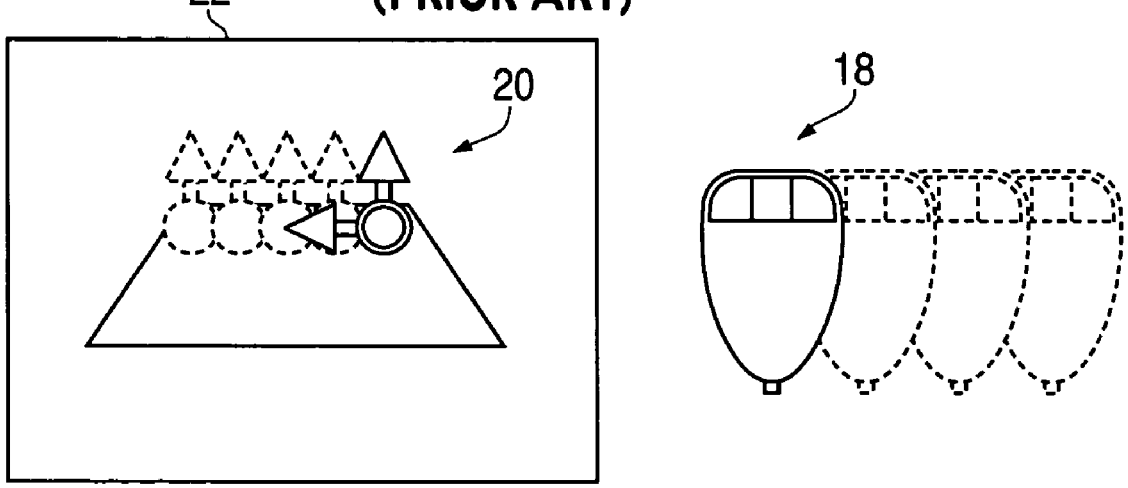
FIG. 3B depicts movement of an input control device and a corresponding on screen graphical object when the viewpoint and the input reference disagree in accordance with conventional systems.
Figure 4A:
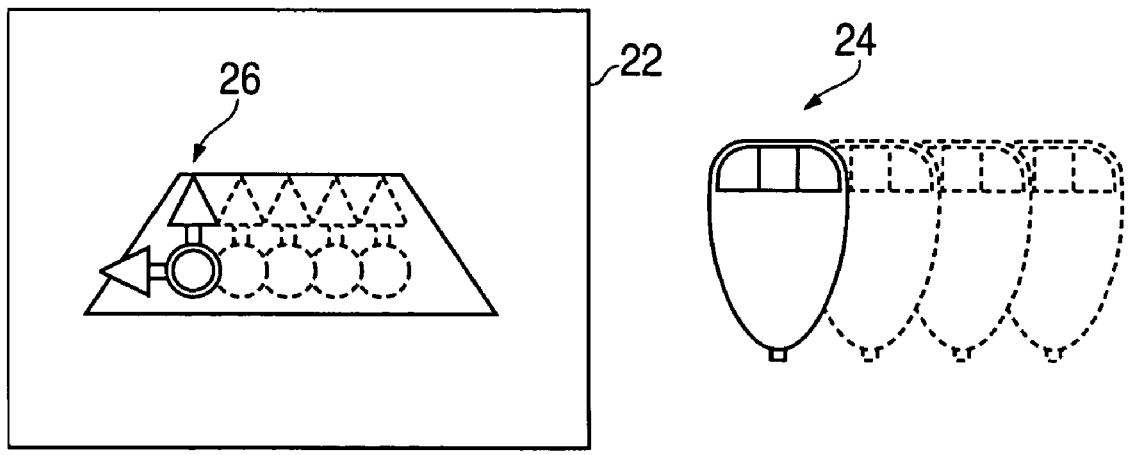
FIGS. 4A-4D illustrate the movements of a graphical object as the viewpoint changes in the present invention.

As shown in FIGS. 4A-4D, the present invention behaves as intuitively expected by the user. With the user's viewpoint into the scene of the display 22 and input device reference in constant agreement, the movement of the input device 24 always corresponds to the movement of the graphical object 26 in the scene. With the viewpoint of scene at a 0 degree position, the movement of the mouse 24 from right to left results in a corresponding right to left movement of the object 26 as shown in FIG. 4A.

Figure 4B:
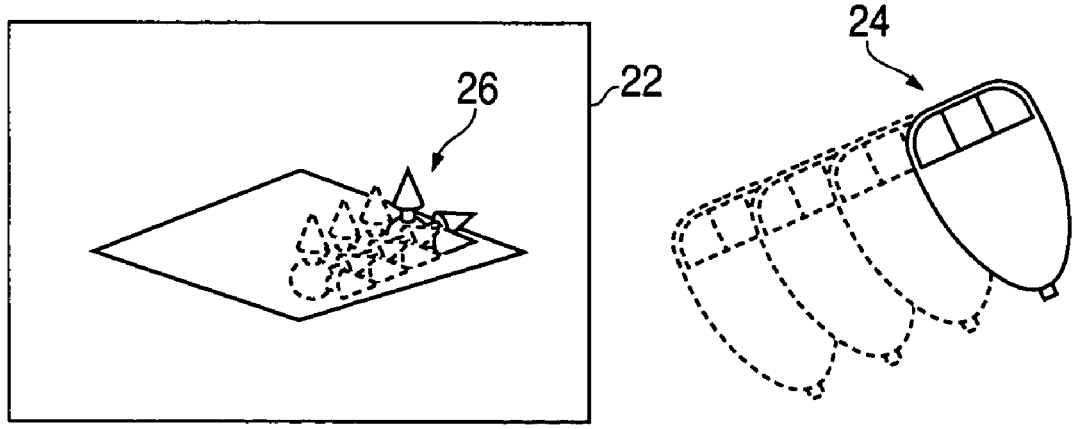

When the scene is rotated by 45 degrees as shown in FIG. 4B, any motion of the mouse 24 (diagonally left to right) in a scene matching diagonal direction results in a corresponding motion of the object 26 (diagonally left to right). Note that in this situation, motions of the mouse 24 that are not along the diagonal will not result in motions of the object 26 whereas even slight motions along the diagonal by the mouse 24 as it moves along some direction that has a diagonal component will result in a motion along the diagonal corresponding to that component.

Figure 4C:
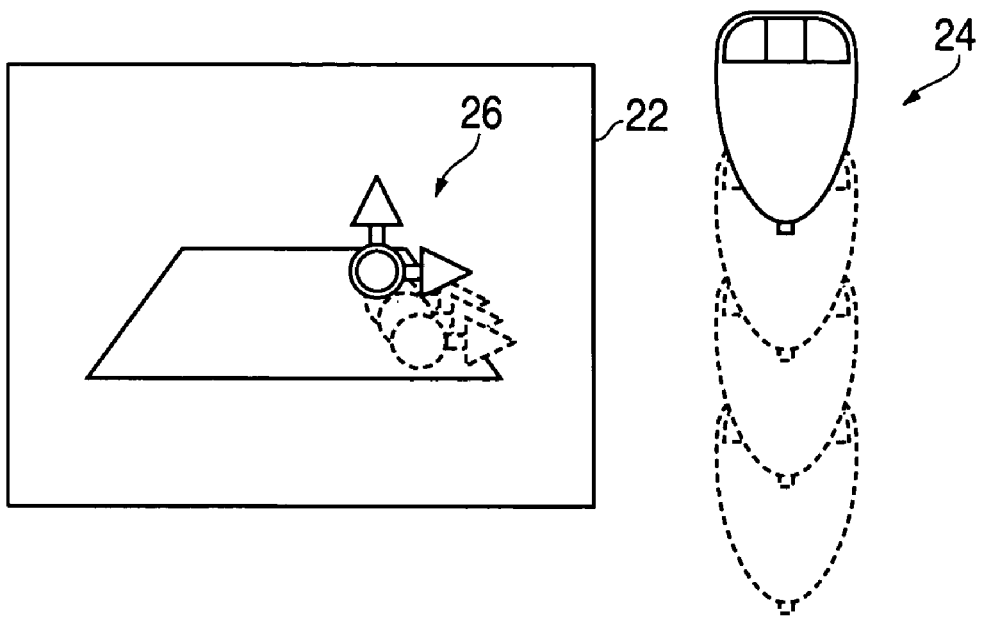

When the scene is rotated by 90 degrees as shown in FIG. 4C, motions by the mouse 24 away from the user results in motions by the object 26 away from the user.

Figure 4D:
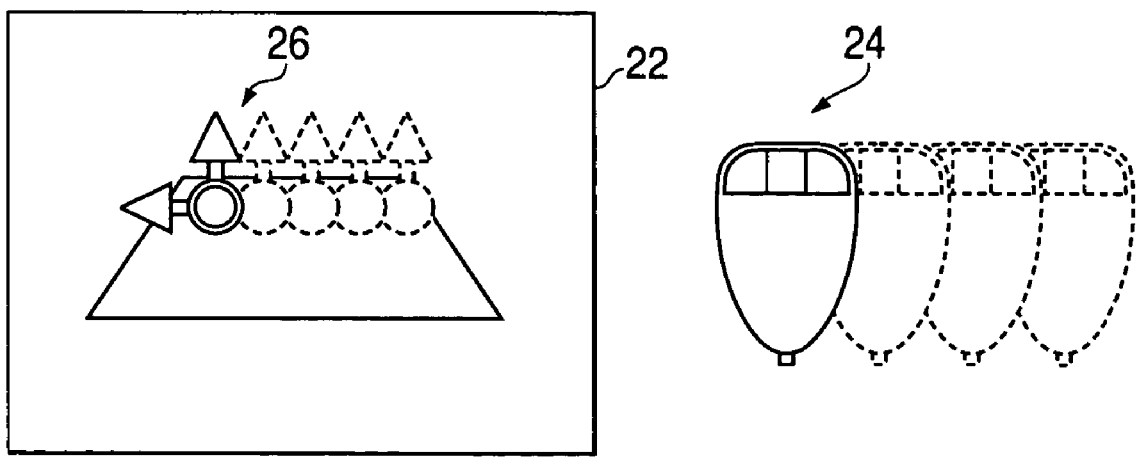

FIG. 4D illustrates a situation where the scene has been tumbled or rotated by 180 degrees. As can be seen, when the mouse 24 is moved from right to left the object 26 correspondingly moves from right to left as the user would intuitively expect. This is in comparison with FIG. 4B where the exact opposite happens.

Figure 5A:
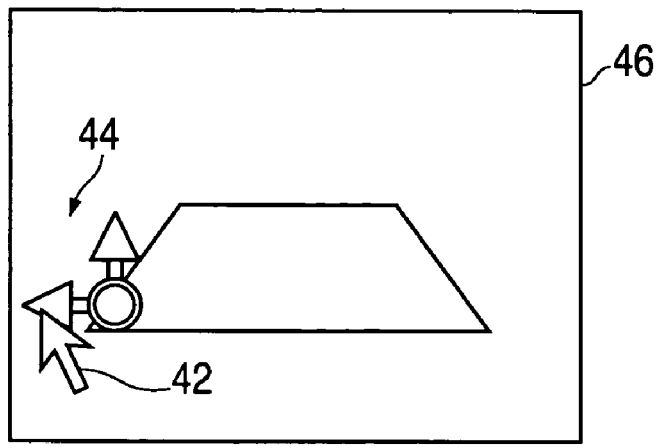
FIGS. 5A-5C show movement of a screen cursor and a graphical object when an edge of the screen is encountered.
Figure 5B:
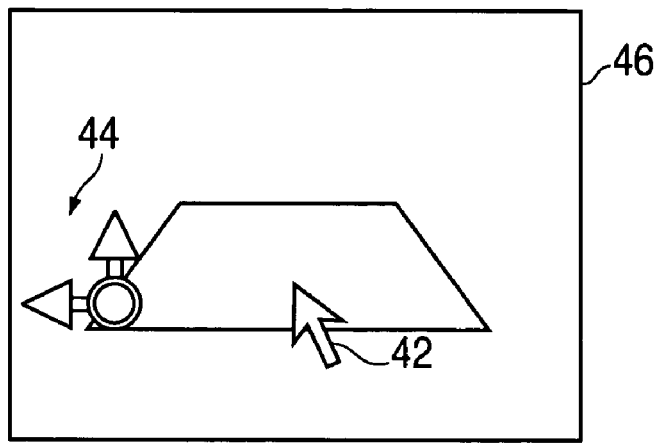
Figure 5C:
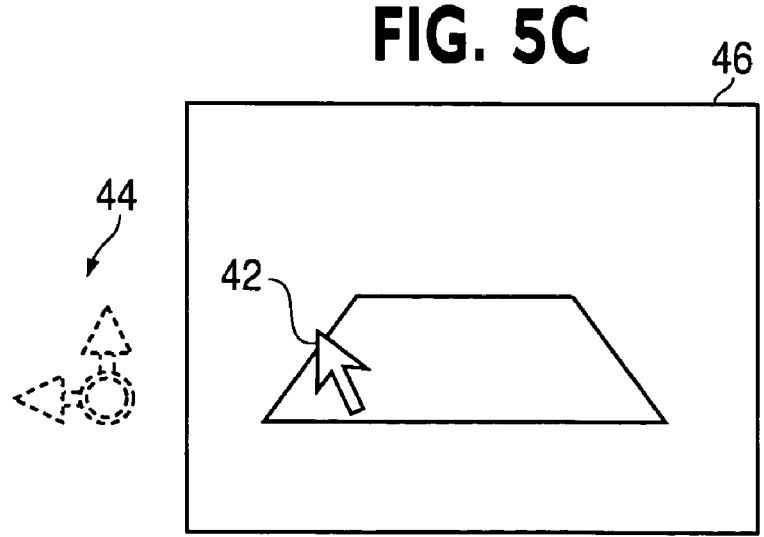

The present invention also addresses the attention dividing and movement limitation issues discussed above as depicted in FIGS. 5A-5C. In the situation shown in FIG. 5A, the cursor 42 (shown as a shadowed outline to reflect that it is not actually visible on the screen) and the graphical object 44 have just been moved to the left edge of the screen 46 by an input device (not shown) moving from right to left. When the edge of the screen (or some predetermined distance from the edge) is encountered, the cursor 42 is mapped back to the center of the screen while the object 44 being moved remains in it's original position. As shown in FIG. 5C, if the user continues to move the input device from right to left after the edge of the screen is reached, the screen cursor moves from right to left as shown while the object 44 continues to move in the same direction in the scene and moves out of the view of the scene being produced or viewed by the virtual camera.

Figure 6:
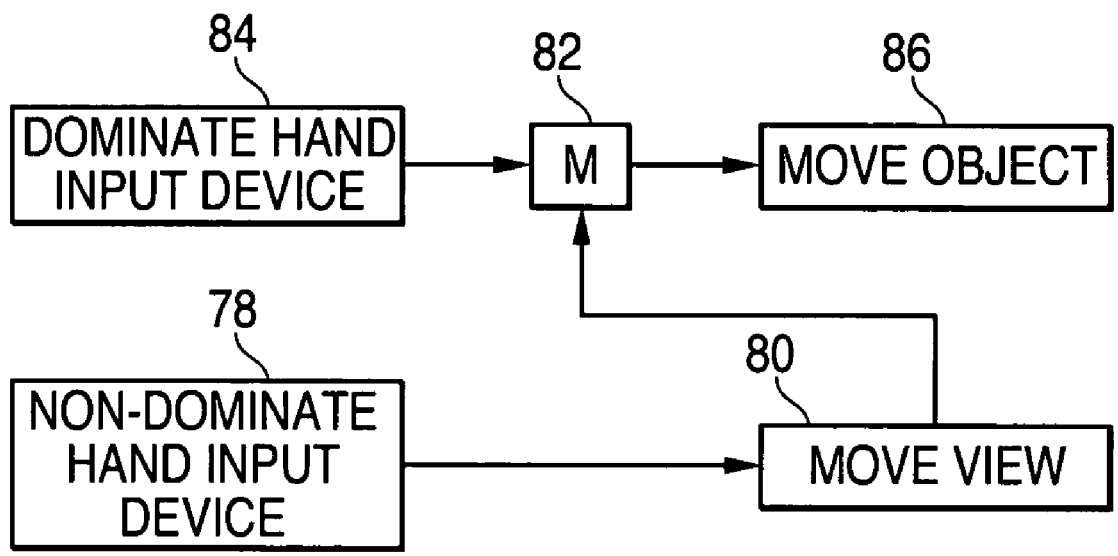
FIG. 6 depicts the interaction between the mapping and the view change in the present invention.

In the present invention, with the proposed two-handed interface, the view can change while the object is being manipulated. As shown in FIG. 6, when the non-dominant hand input device 78 is used to move 80 the view, the movement of the view is used to change the mapping 82. When the dominant hand input device 84 supplies an input to change the location of the graphical object, the revised mapping 82 is reflected in the movement 86 of the object. In the present invention, the input-to-object mapping (M) is dynamically updated to reflect the changing current viewpoint. This results in the "correct" interaction being applied to the object.

This dynamic change in the mapping is performed as follows:

```
pseudo-code for the cursor to object mapping
// this procedure is called EVERY time there's movement in EITHER the
// LeftHand or RightHand input device
void CursorToObjectMapping(Display *display, Window win, Boolean
End)
{
    int wXposition, wYposition;
    unsigned int wHeight, wWidth;
    Window root_return;
    unsigned int border_width, depth;
    double ox, oy, oz;
    GLdouble model[16];
    GLdouble proj[16];
    GLdouble m[16];
    GLint view[4];
// get the coordinates of the display window
    XGetGeometry(display, win,
            &root_return,        /* root window */
            &wXposition, &wYposition, /* window position */
            &wWidth, &wHeight,       /* window size */
            &border_width,
            &depth);
// update the viewpoint change by rotations about elevation
// and azimuth
// dev.rotX and dev.rotY are the viewpoint rotation values
// supplied by the
LeftHand input device
    glRotated(dev.rotX, 0.0, 1.0, 0.0);
    glGetDoublev(GL_MODELVIEW_MATRIX, m);
    glRotated(dev.rotY, m[0], m[4], m[8]);
// get the latest projection and view matrices from the
// graphics pipeline
    glGetDoublev(GL_MODELVIEW_MATRIX, model);
    glGetDoublev(GL_PROJECTION_MATRIX, proj);
    glGetIntegerv(GL_VIEWPORT, view);
// do the mapping of cursor to 3D object position using the
// current viewpoint
// first, figure out the point on the 2D display window that
// the 3D object position projects to
// i.e., what is the 2D cursor position (wx, wy) that
/ corresponds to the position of the 3D object (obj)
    gluProject(obj[0], obj[1], obj[2], model, proj, view, &wx, &wy,
&wz);
// next, update the 2D cursor position (wx, wy) based on
// movement of the RightHand input device (dev.rhX,
// rev.rhY)
    wx = wx + dev.rhX;
    wy = wy + dev.rhY;
// project back the 2D cursor position to get new 3D object
// position
    gluUnProject(wx, wy, wz, model, proj, view, &(obj[0]), &(obj[1]),
&(obj[2]);
}
end of pseudo-code
```

Figure 7:
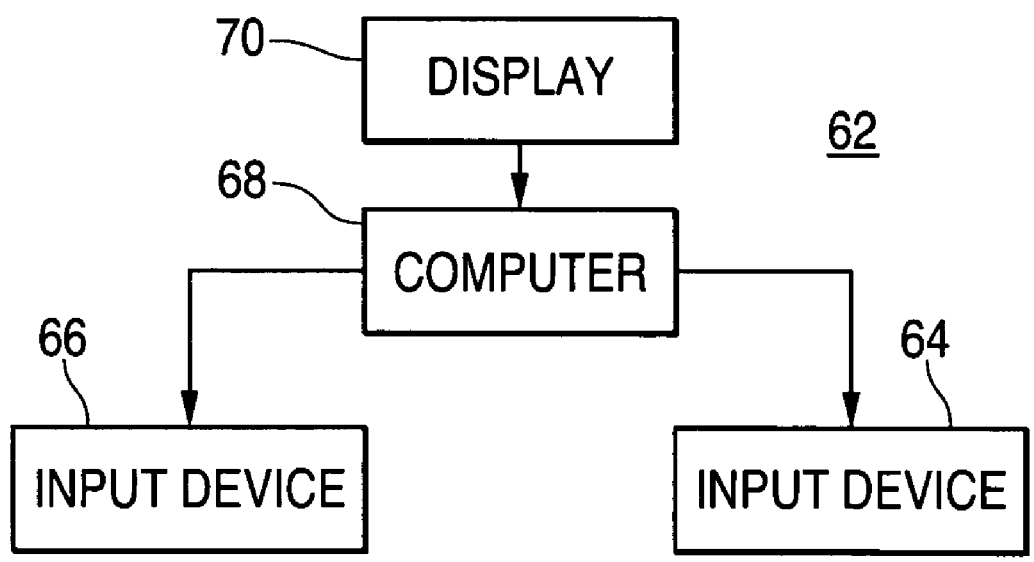
FIG. 7 illustrates the hardware of the invention.

The present invention is preferably implemented in a computer system 62 which includes two degree of freedom input devices 64 and 66 (see FIG. 7) each operated by a different hand of the user, such as a stylus (and accompanying digitizing pad) for the right hand and used for moving a graphical object, such as a paint brush within the scene, and a mouse for the left hand and used for changing the scene viewpoint, allowing four or at least three integrated degree of freedom movement within a 3D virtual space. The input devices 64 and 66 are coupled to a computer 68 such as a Pentium III running Windows NTJ executing a drawing package, such as that previously mentioned. The scene produced by the computer 68, and in which the graphical object appears, is presented on a conventional display 70. The system also includes storage, such as magnetic and optical discs, RAM, ROM, etc. on which the process of the present invention can be stored and distributed. The processes can also be distributed via, for example downloading, over a network such as the Internet.

In a two handed input control, the input device that is used to update the viewpoint of the scene can be used by either the right hand or the left hand of the user. The same device can also be used for both the viewpoint change and any motions of a drawing cursor in a singled handed operation. When the input devices are activated, the present invention performs operations as depicted in FIG. 8. When the system detects 92 that the right (or dominant) hand device button is down, signifying that the graphical object is to be moved, the cursor is hidden 94 (fades away with some animation) so that the graphical object can be moved without splitting the users attention between the object and the 2D screen cursor. If the right hand button is not down, the left (or non-dominant) hand device could be moving signaling a viewpoint change. When the movement is by the left hand device, and such is so detected 96, the system updates 98 the mapping between the right hand device and the object map. In doing this, the system corrects for any mismatch that would occur in the conventional systems.

Once the updating is completed, the system ascertains 100 whether the right hand device has moved with the button down. If so, the graphical object is moved 102 (and the 3D position of the object is saved) responsive to the motion of the input device. The position of the screen cursor also is updated 104 (and saved). Next, the right hand non-movement algorithm (such as a conventional painting algorithm) is performed 106.

The system then determines 108 whether the 2D cursor is at the edge of the screen and, if so, the cursor is moved, warped or remapped 110 preferably back to the center of the screen by setting its coordinates to a center of the screen. (Note the cursor could also be screen wrapped, maintained on the screen edge, moved to another location, etc.) When the right hand device has not moved, the right hand non-movement algorithm is performed 112 when the right hand button is down. This causes the particular desired operation, such as painting, to occur when the view is being changed with the non-dominant hand and the dominant hand signals that the desired operation is to be performed. For example, with the right hand button activated, no movement by the right hand but a movement of the left hand causes a rotation of the view to occur. The tool of the right hand causes the operation (for example, painting) to occur while the view is being changed, despite the fact that no movement occurred in the right hand.

Next, the system looks 114 for a release of the right hand device button indicating a release of the currently operational tool. When the release has occurred, the system determines 116 the position of the 2D cursor relative to the graphical object (a ray is essentially shot or cast—reverse mapped—from the object back through the screen to determine the position of the object on the screen). The 2D cursor position is changed to that of the object if the ray passes through the screen. Otherwise, the position of the cursor is not changed. The system then shows 118 the 2D cursor at its position and redraws the 3D scene with the update to the viewpoint, graphical object at its 3D saved position and 2D cursor at its 2D saved position. (Note that the graphical object may not be in the visual space of the display and would therefor not be in the updated scene.)

Figure 9A:
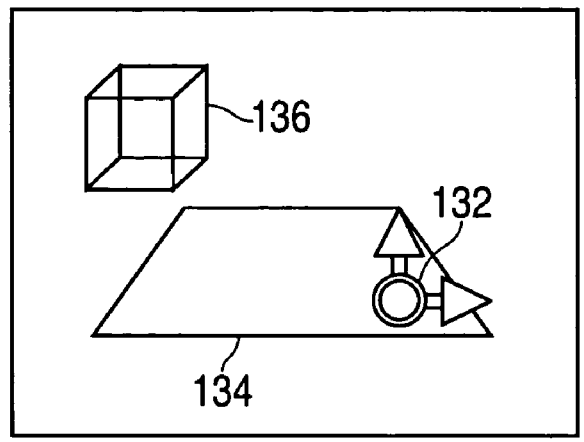
FIGS. 9A-9C show a two handed task performed with the present invention.
Figure 9B:
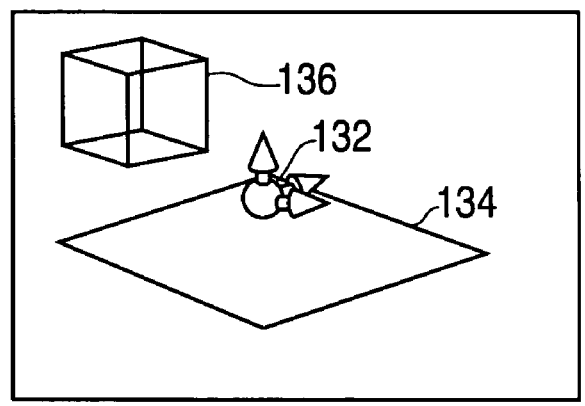
Figure 9C:
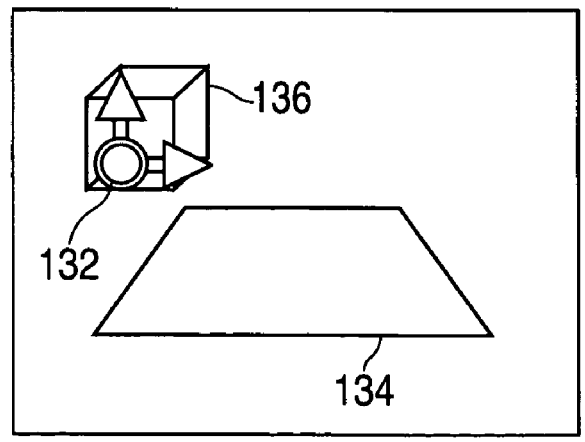

The present invention allows a two handed task, such as shown in FIGS. 9A-9C, to be accomplished. In this sequence of figures, the user selects an object 132 in one corner of a virtual 3D scene having a ground plane field 134 to provide depth perception and places the object 132 inside a target object 136 located at the diagonally opposite corner using two-handed interaction. Specifically, in this two handed operation, the user selects and manipulates the object 132 with a dominant hand mouse, while the non-dominant hand operates a second mouse which controls the camera. In this case, both the camera and the object are manipulated simultaneously. As a result, it is possible to move the object 132 to the target 136 in a single movement with the non-dominant hand controlling the viewpoint or virtual camera and coordinating it's movements with the dominant hand controlling the object 136 (one way of visualizing this movement is to think of the virtual camera being moved such that the target 136 is being brought closer to the viewer, while the object 132 is also being moved such that it is also being brought closer to the viewer. At some point in the middle, the object and target will meet).

The present invention has been described with respect to constantly changing the input-to-object mapping responsive to the viewpoint change information. However, it is also possible to cause the mapping to be changed at predetermined changes in viewpoint, such as reversing the mapping when the viewpoint changes by more than 90 degrees.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to falling within the scope of the invention.

What is claimed is:

1. A method, comprising:
   inputting viewpoint change information and graphical object change information substantially simultaneously;
   synchronizing control and display mappings to conform with input of a user whereby moving an input device controlling a graphical object in a direction continues to control the object in the same direction even if the object is rotated by dynamically changing an input-to-object mapping responsive to the viewpoint change information a viewpoint is changing; and
   moving the graphical object responsive to the graphical object change information and the dynamically changed mapping and changing the object in a scene and changing the viewpoint of the scene, and
   wherein the changing the input-to-object mapping is performed substantially simultaneously while both the viewpoint is changing and the object is moving.

2. A method as recited in claim 1, wherein tool activation information is input and a tool is operated during a change in a current viewpoint.

3. A method, comprising:
   receiving an input from a graphical object motion input device; and
   synchronizing control and display mappings to conform with the input whereby moving the input device in a direction continues to move a graphical object in the same direction even if the object is rotated by correlating motion of the graphical object in a three-dimensional scene to the input regardless of the viewpoint of the scene and changing the object in a scene and changing a viewpoint of the scene responsive to the input while the viewpoint changes, and
   wherein the motion of the object is correlated responsive to the input substantially simultaneously while the viewpoint is changing.

4. A method, comprising:
   receiving an input from a graphical object motion input device; and
   maintaining a cursor within a visual display region of a visual display regardless of a position of a graphical object within a virtual scene associated with the display while a viewpoint changes and changing the object in a scene and changing the viewpoint of the scene responsive to the input while synchronizing control and display mappings to conform with the input whereby moving the input device in a direction continues to move the object in the same direction even if the object is rotated, and
   wherein the object is changed responsive to the input substantially simultaneously while the viewpoint is changing.

5. A method, comprising:
   inputting viewpoint change information; and
   synchronizing control and display mappings to conform with input of a user whereby moving an input device controlling a graphical object in a direction continues to control the object in the same direction even if the object is rotated by dynamically changing an input-to-object mapping to reflect a current viewpoint responsive to the viewpoint change information and changing the object in a scene and changing a viewpoint of the scene as the viewpoint changes, and
   wherein the changing the input-to-object mapping is performed substantially simultaneously while both the viewpoint is changing and the object is changing.

6. A method as recited in claim 5, wherein tool activation information is input and a tool is operated during a change in the current viewpoint.

7. A system, comprising:
   first and second input devices inputting viewpoint change information and graphical object change information substantially simultaneously;
   a visual display showing a virtual scene having a viewpoint and a graphical object within the scene; and
   a computer synchronizing control and display mappings to conform with input from the first and second input devices whereby if the object is moved in a direction, the object continues to move in the same direction even if the object is rotated by dynamically changing an input-to-object mapping responsive to the viewpoint change information while the viewpoint changes, changing the viewpoint of the scene responsive to the viewpoint change information, and changing the graphical object responsive to the graphical object change information and the dynamically changed mapping, and
   wherein the changing the input-to-object mapping is performed substantially simultaneously while both the viewpoint is changing and the object is changing.

8. A system, comprising:
   dominant and non-dominant hand input devices, the non-dominant hand device providing input;
   a visual display showing a virtual scene having a viewpoint; and
   a computer synchronizing control and display mappings to conform with input from the input devices whereby an object moving in a direction continues to move in the same direction even if the object is rotated by mapping the input to viewpoint changes while the viewpoint changes and changing the object in a scene and changing a viewpoint of the scene responsive to the input, and wherein the mapping changes occur substantially simultaneously while both the viewpoint is changing and the object is changing.

9. A system, comprising:

first and second two degree of freedom input devices providing input;

a visual display showing a virtual scene; and a computer providing at least three integrated degree of freedom movement within the scene responsive to the input from the devices, and synchronizing control and display mappings to conform with the input whereby moving an object moving in a direction continues to move in the same direction even if the object is rotated by changing the object in the scene and changing a viewpoint of the scene responsive to the input while the viewpoint changes, and wherein the movement within the scene is performed substantially simultaneously while both the viewpoint is changing and the object is changing.

10. A computer readable storage controlling a computer by substantially simultaneously inputting viewpoint change information and graphical object change information, synchronizing control and display mappings to conform with input from a user whereby moving an input device controlling a graphical object in a direction continues to control the object in the same direction even if the object is rotated by dynamically changing an input-to-object mapping substantially simultaneously responsive to the viewpoint change information while both a viewpoint changes, and the graphical object moves responsive to the graphical object change information and the dynamically changed mapping and changing the object in a scene and changing a viewpoint of the scene are responsive to the viewpoint change information and graphical object change information.

11. A method, comprising:

inputting viewpoint change information and graphical object change information substantially simultaneously;

synchronizing control and display mappings to conform with input from a user whereby moving an input device controlling a graphical object in a direction continues to control the object in the same direction even if the object is rotated by dynamically changing an input-to-object mapping responsive to the viewpoint change information while a viewpoint changes;

moving the graphical object responsive to the graphical object change information and the dynamically changed mapping; and producing a display screen cursor that disappears when the object change information is being input, and wherein the changing the input-to-object mapping is performed substantially simultaneously while both the viewpoint changes and the object is moving.

12. A method as recited in claim 11, further comprising maintaining the cursor within a possible movement area of a visual display region of a visual display regardless of a position of the object within a virtual scene.

13. A system, comprising:

first and second input devices inputting viewpoint change information and graphical object change information substantially simultaneously;

a visual display showing a virtual scene having a viewpoint and a graphical object within the scene; and a computer synchronizing control and display mappings to conform with input from the input devices whereby the graphical object moving in a direction continues to move in the same direction even if the object is rotated by dynamically changing an input-to-object mapping responsive to the viewpoint change information while the viewpoint changes, changing the viewpoint of the scene responsive to the viewpoint change information, and changing the graphical object responsive to the graphical object change information and the dynamically changed mapping, and wherein said computer produces a display screen cursor displayed on the visual display that disappears when the object change information is being input and the changing the input-to-object mapping is performed substantially simultaneously while both the viewpoint is changing and the object is changing.

14. A system, comprising:

first and second input devices inputting viewpoint change information and graphical object change information substantially simultaneously;

a visual display showing a virtual scene having a viewpoint and a graphical object within the scene; and a computer synchronizing control and display mappings to conform with input from the input devices whereby the graphical object moving in a direction continues to move in the same direction even if the object is rotated by dynamically changing an input-to-object mapping responsive to the viewpoint change information while the viewpoint changes, changing the viewpoint of the scene responsive to the viewpoint change information, and changing the graphical object responsive to the graphical object change information and the dynamically changed mapping, and wherein the changing the input-to-object mapping is performed substantially simultaneously while both the viewpoint is changing and the object is changing.

15. A method, comprising:

inputting viewpoint change information and graphical object change information substantially simultaneously; and synchronizing control and display mappings to conform with input from a user whereby moving an input device controlling a graphical object in a direction continues to control the object in the same direction even if the object is rotated by dynamically changing an input-to-object mapping to reflect a current viewpoint responsive to the viewpoint change information and presenting a view to a user where intended motion input by the user matches apparent motion presented/displayed to the user, and wherein the changing the input-to-object mapping is performed substantially simultaneously while both the viewpoint change information and graphical object change information are input.

16. A method, comprising:

inputting viewpoint change information and graphical object change information substantially simultaneously;

synchronizing control and display mappings to conform with input from a user whereby moving an input device controlling a graphical object in a direction continues to control the object in the same direction even if the object is rotated by dynamically changing an input-to-object mapping to reflect a current viewpoint responsive to the viewpoint change information by maintaining a correspondence between the current viewpoint and an input space; and presenting a view to a user where intended motion input by the user matches apparent motion presented/displayed to the user, and wherein the changing the input-to-object mapping is performed substantially simultaneously while the viewpoint change information and the graphical object change information are input.

17. A method, comprising:

inputting viewpoint change information and graphical object change information substantially simultaneously;

synchronizing control and display mappings to conform with input from a user whereby moving an input device controlling an object in a direction continues to control the object in the same direction even if the object is rotated by dynamically changing an input-to-object mapping to reflect a current viewpoint responsive to the viewpoint change information by maintaining a correspondence between the current viewpoint and an input space, comprising:

determining a position of the object;

updating a cursor position of a cursor; and projecting the cursor position to obtain a new object position; and presenting a view to a user where intended motion input by the user matches apparent motion presented/displayed to the user, and wherein the changing the input-to-object mapping is performed substantially simultaneously while both the viewpoint change information and the graphical object change information are input.

18. A method, comprising:

inputting viewpoint change information and graphical object change information substantially simultaneously;

synchronizing control and display mappings to conform with input from a user whereby moving an input device controlling a graphical object in a direction continues to control the object in the same direction even if the object is rotated by dynamically changing an input-to-object mapping to reflect a current viewpoint responsive to the viewpoint change information by maintaining a correspondence between the current viewpoint and an input space, comprising:

determining a 2D window position of an object in a 3D scene projected onto the 2D window;

updating a 2D cursor position of a cursor responsive to cursor input; and projecting the 2D cursor position into the 3D scene to obtain a new object position; and updating a display to present a view to a user where intended motion input by the user matches apparent motion presented/displayed to the user, and wherein the changing the input-to-object mapping is performed substantially simultaneously while both the viewpoint change information and graphical object change information are input.

19. A method, comprising:

inputting viewpoint change information and graphical object change information substantially simultaneously;

synchronizing control and display mappings to conform with input from a user whereby moving an input device controlling a graphical object in a direction continues to control the object in the same direction even if the object is rotated by dynamically changing an input-to-object mapping responsive to the viewpoint change information while a viewpoint is changing;

moving the graphical object responsive to the graphical object change information and the dynamically changed mapping and changing the object in a scene and changing the viewpoint of the scene; and changing the input-to-object mapping substantially simultaneously while both the viewpoint is changing and the object is moving, the input-to-object mapping responsive to a direction of movement of the input device just prior to a change in viewpoint, wherein old viewpoint information input is replaced with new viewpoint information in order to calculate an object transformation and the direction of movement of the input device results in a same direction of movement of the object regardless of the viewpoint.

20. A method, comprising:

inputting viewpoint change information and graphical object change information of a graphical object substantially simultaneously by a computer and synchronizing control and display mappings to conform with input of a user whereby an input device controlling the object in a direction continues to control the object in the same direction as a view of the object is rotated; and moving and changing the graphical object responsive to the viewpoint change information and the graphical object change information according to the control and display mappings.

* * * * *